Aug. 6, 1935.     L. SHOWERS ET AL     2,010,419
GLASS MELTING FURNACE
Filed Aug. 26, 1933     5 Sheets-Sheet 1

INVENTORS
LEE SHOWERS AND
KARL G. KUTCHKA.
ATTORNEYS

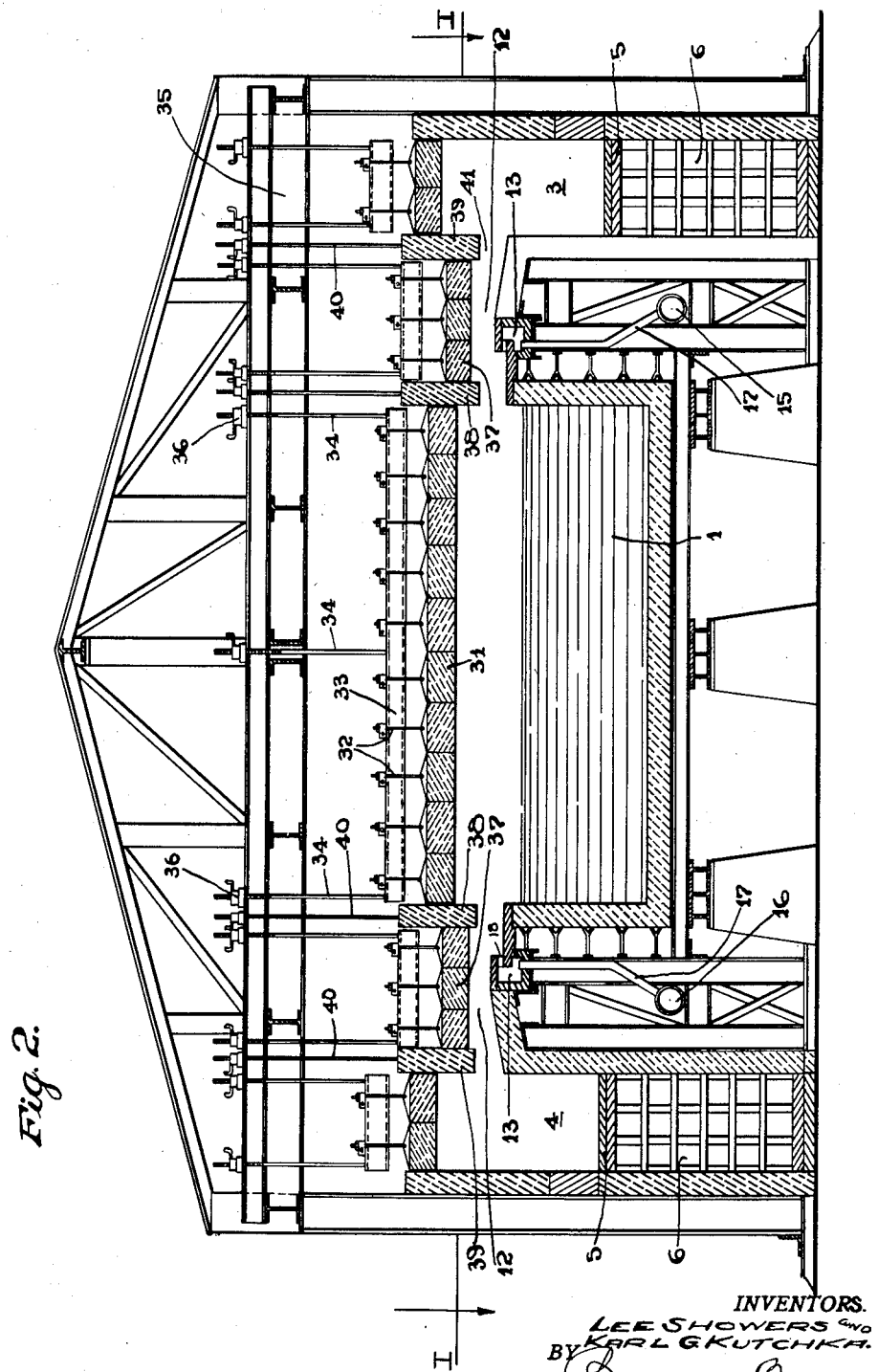

Aug. 6, 1935.       L. SHOWERS ET AL       2,010,419
GLASS MELTING FURNACE
Filed Aug. 26, 1933       5 Sheets-Sheet 3
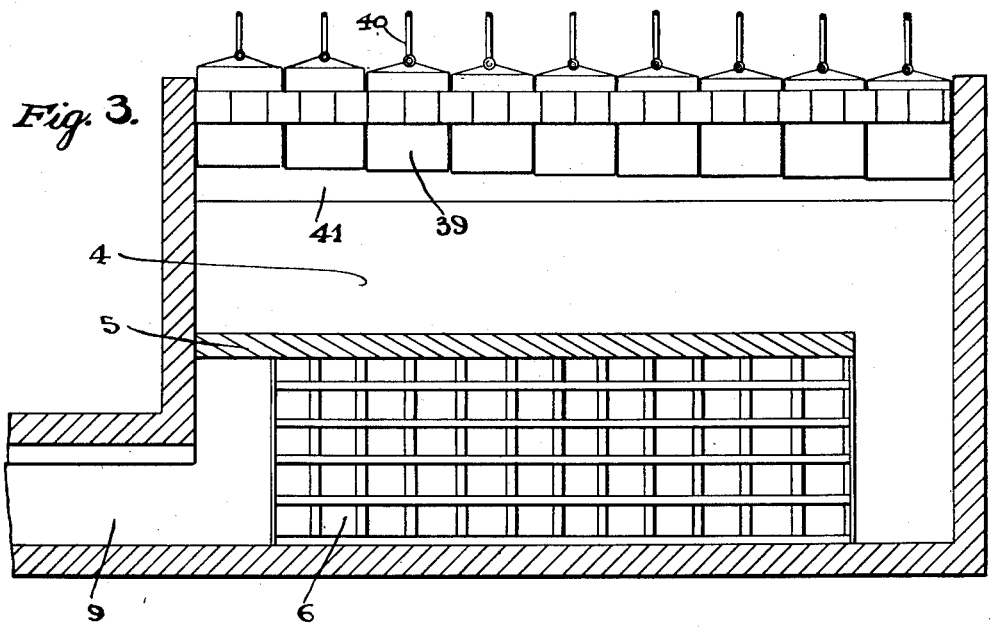
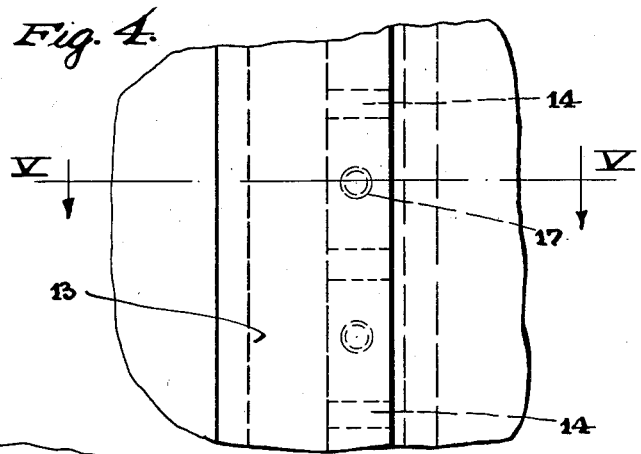
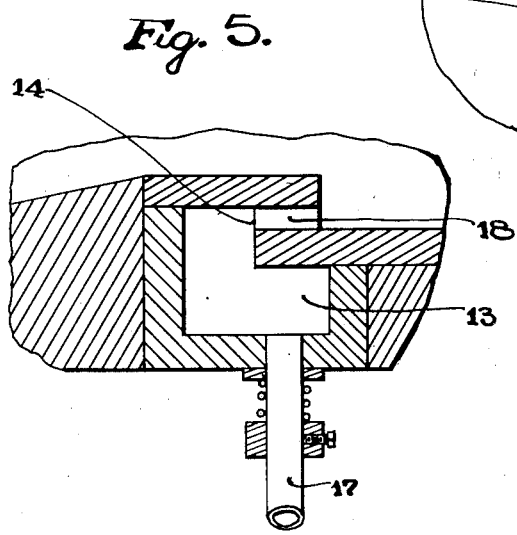
INVENTORS
LEE SHOWERS AND
KARL G. KUTCHKA.
BY Bradley + Bee
ATTORNEYS.

Aug. 6, 1935.  L. SHOWERS ET AL  2,010,419
GLASS MELTING FURNACE
Filed Aug. 26, 1933  5 Sheets-Sheet 4

INVENTORS
LEE SHOWERS and
KARL G. KUTCHKA.
BY
ATTORNEYS.

Aug. 6, 1935.  L. SHOWERS ET AL  2,010,419
GLASS MELTING FURNACE
Filed Aug. 26, 1933  5 Sheets-Sheet 5

INVENTORS
LEE SHOWERS &
KARL G. KUTCHKA.
BY
ATTORNEYS.

Patented Aug. 6, 1935

2,010,419

UNITED STATES PATENT OFFICE 2,010,419

GLASS MELTING FURNACE

Lee Showers, Charleroi, and Karl G. Kutchka, Wilkinsburg, Pa., assignors to Pittsburgh Plate Glass Company, a corporation of Pennsylvania Application August 26, 1933, Serial No. 686,958

7 Claims. (Cl. 263—15)

Figure 1:
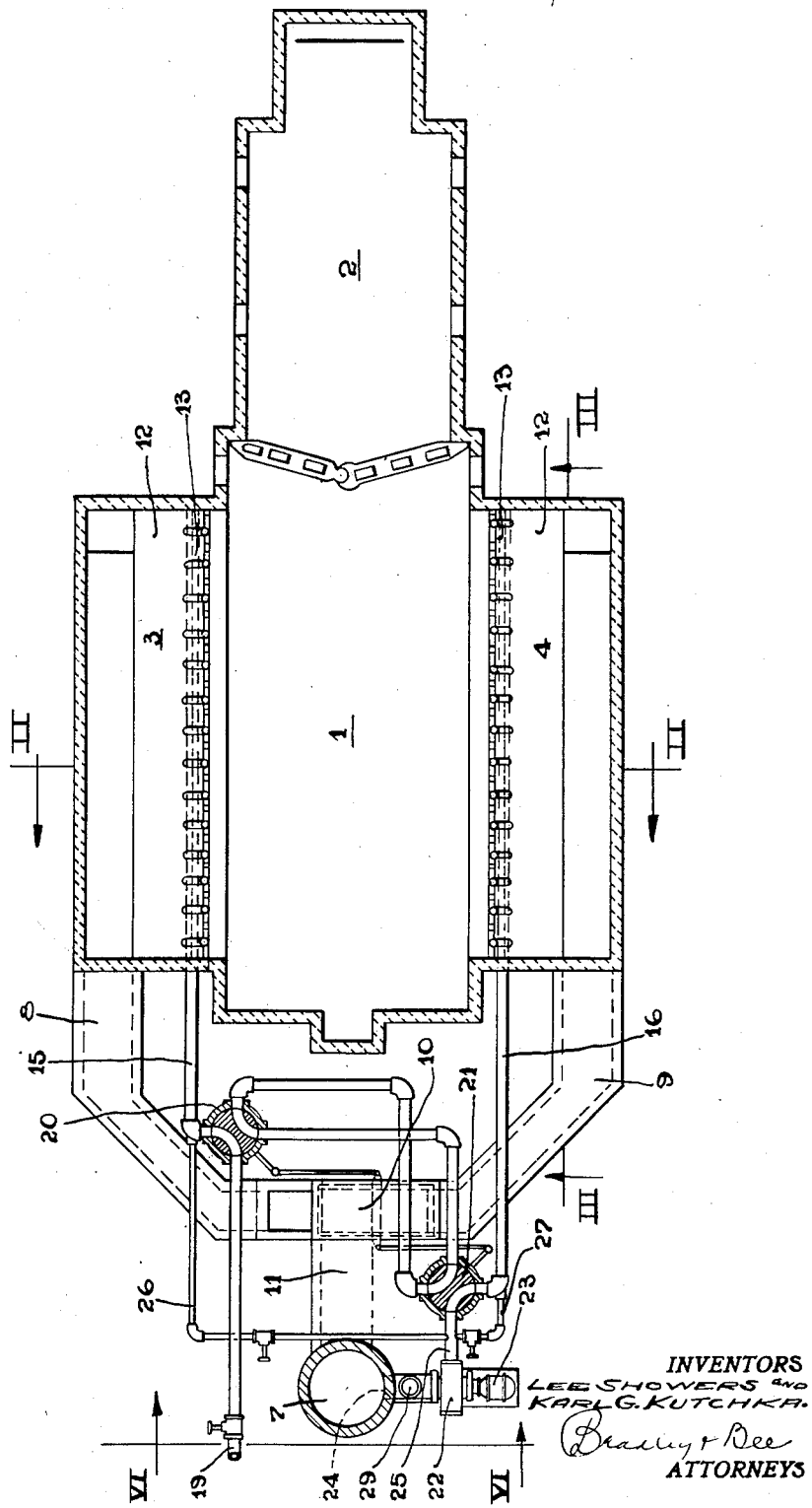
Figure 6:
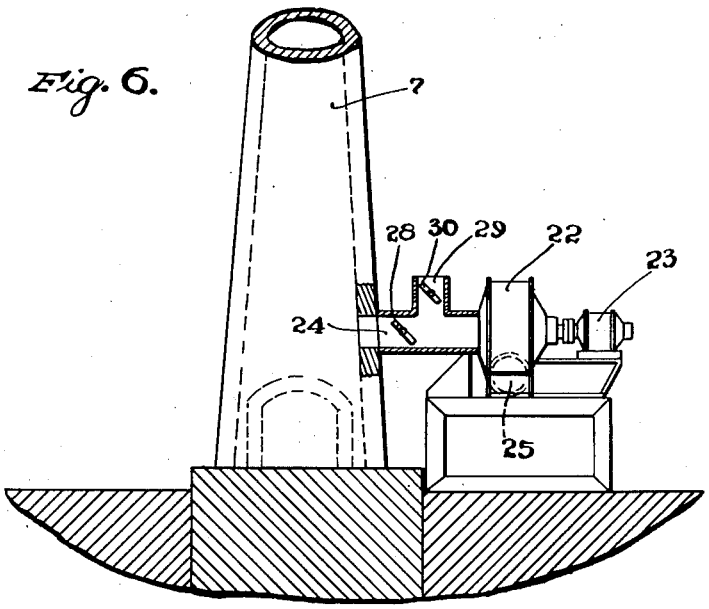
Figure 7:
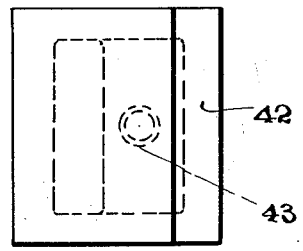
Figure 8:
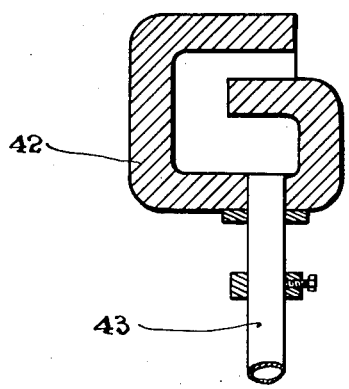
Figure 9:
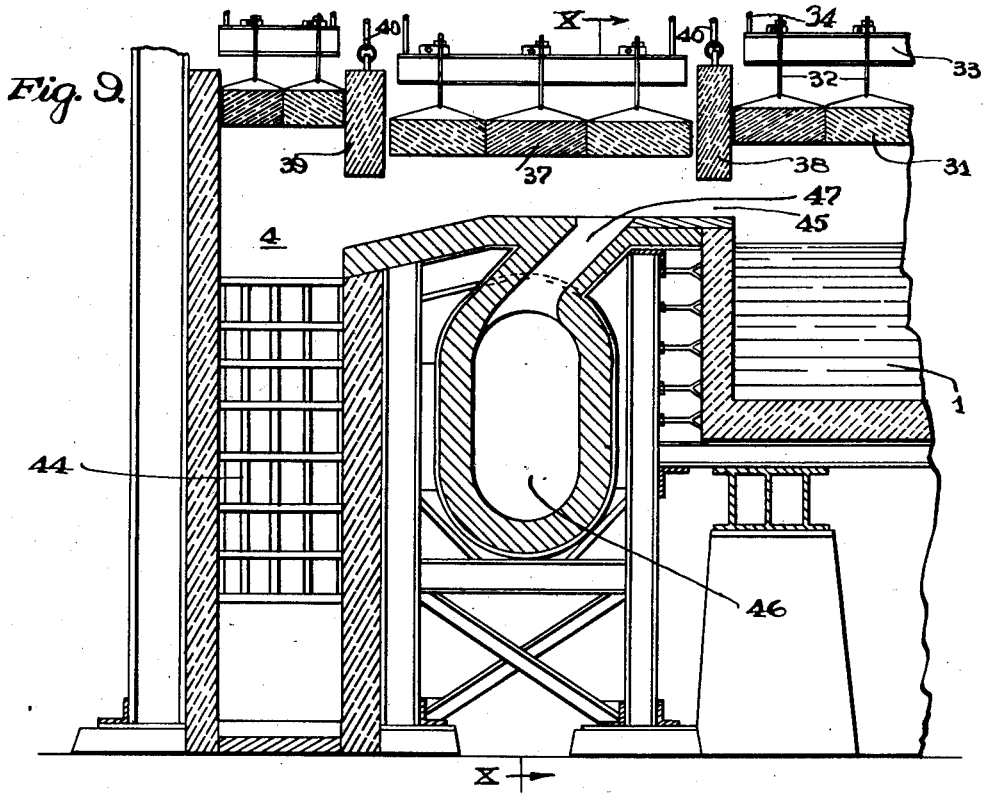
Figure 10:
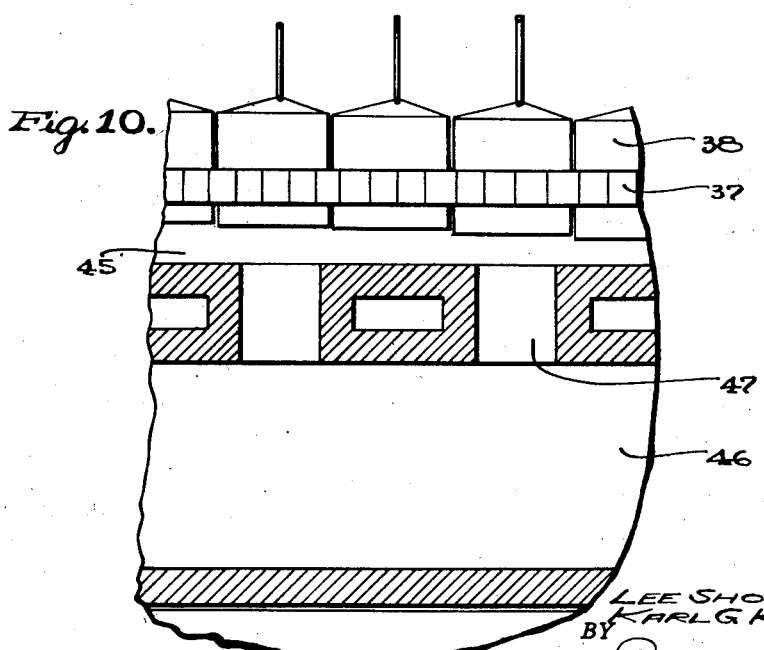

The invention relates to a glass melting furnace of the regenerator type, and has for its principal objects; the provision of an improved burner construction especially adapted to produce the so-called luminous flame and thus increase the economy of operation and the capacity of the furnace; the provision of means whereby the refractory burner blocks through which the gas for combustion is supplied are protected when the flow of the gases of combustion across the furnace is reversed; and the provision of improved means for regulating the flow of the gases of combustion through the ports, and the proportioning of such flow along the length of the ports, so that the heat applied along the length of the melting portion of the furnace may be adjusted to give the greatest efficiency. Certain embodiments of the invention are illustrated in the accompanying drawings, wherein:

Figure 1 is a horizontal section on the line I—I of Fig. 2. Fig. 2 is a vertical section on the line II—II of Fig. 1. Fig. 3 is a vertical section on the line III—III of Fig. 1. Figs. 4 and 5 are enlarged detail views of the burner construction, Fig. 4 being a partial plan view and Fig. 5 a section on the line V—V of Fig. 4. Fig. 6 is a section on the line VI—VI of Fig. 1. Figs. 7 and 8 are detail views of a modified form of burner, Fig. 7 being a plan view, and Fig. 8 a vertical section. And Figs. 9 and 10 are views showing another modification, Fig. 9 being a longitudinal vertical section through a part of the furnace, and Fig. 10 a partial transverse section on the line X—X of Fig. 9.

Referring to the construction of Figs. 1 to 6, 1 is the melting end of a glass furnace, and 2 is the outlet or fining end. Extending along each end of the melting end of the furnace are the two regenerator chambers 3 and 4 preferably of the horizontal type, each chamber being divided into an upper and lower compartment by means of the wall 5, (Fig. 3) the checker work 6 being disposed beneath such wall. The ends of the checker chambers communicate with the stack 7 by means of the passages 8 and 9, (Fig. 1) the usual reversing valve mechanism 10 being employed where the passages 8 and 9 joint at the conduit 11 which leads into the stack.

The checker chambers each communicate with the melting end of the furnace by a single elongated port 12 (Fig. 2), and the combustible gas for each port is supplied through a gas box 13 extending the length of the port, but divided into sections in so far as the outlet is concerned by means of the division walls or spacers 14, as indicated in Figs. 4 and 5. Gas is supplied to the boxes by means of the pipes 15 and 16 extending longitudinally of the boxes and communicating therewith by means of the plurality of vertical pipes 17. The outlets 18 for the boxes are directed toward the furnace along the bottom walls of the ports 12 so that in operation, a layer of gas is directed into the furnace substantially in parallelism with the line of flow of the air through the ports. This arrangement promotes the formation of the so-called luminous flame, as the highly heated air decomposes the $CH_4$ gas into carbon flakes and H. The carbon flakes burn into combustible mixture giving a flame of very high heat and reflecting power. The heat thus provided is much greater than is the case when the hot combustible gas is directed into the heated air at an angle thereto instead of in parallelism therewith, as above described. The form of burner, therefore, materially adds to the efficiency of the apparatus.

The gas for the burners is supplied to the pipes 15 and 16 from the main 19 (Fig. 1), provided with the two-way valves 20 and 21. When the valves are in the position shown in Fig. 1, gas is supplied to the pipe 15 and the supply of gas to the pipe 16 is cut off. To reverse the flow of gas so that it passes through the pipe 16 instead of the pipe 15, the valve 20 is rotated in a clockwise direction 90 degrees and the valve 21 is rotated in a counter clockwise direction 90 degrees. Provision is also made for mixing an inert gas or a mixture of inert gas and air with the combustible gas supplied through the pipes 15 and 16. This is desirable in some gases as is well known in the art, in order to prevent the gas from burning in the end of the port or at a point in the furnace too close to the outlet end of the port. By supplying inert gas or air, or a mixture of gas and air under pressure, the flame may be lengthened and the efficiency of the apparatus substantially increased. In order to accomplish this result, the fan blower 22, driven from the motor 23 and having its suction inlet 24 connected to the stack 7, is employed, this construction being shown in Fig. 6 in connection with Fig. 1. The fan is provided with an outlet pipe 25, from which two branch pipes 26 and 27 lead respectively to the gas pipes 15 and 16. The suction inlet 24 is provided with a regulating valve 28 and has an air inlet 29 regulated by a valve 30 so that in the operation of the device, it is possible to supply either inert gas altogether, or air altogether, or a mixture of the two. In order to protect the burner blocks 13, 13 on the side of the furnace, toward which the heated gases are flowing, such as the left hand side, as shown in Fig. 2, it is desirable to maintain a flow of gas through the burner blocks during this period of operation and this flow must necessarily be of noncombustible gas, such as air or an inert gas, or a mixture of the two, and this is accomplished by the use of the valves 20 and 21 which will switch the main flow of gas from the blower 22 either through the pipe 15 or the pipe 16. When the valves are positioned as shown in Fig. 1, at which time combustible gas is being supplied through the pipe 15, the valve 21 is positioned so that the noncombustible gas from the blower is forced through the pipe 16. A cooling flow of noncombustible gas is thus provided through the burners 13 on the left hand side of the furnace, and these burners are cooled to such an extent that they will last several times as long as would be the case if no cooling flow of gas were provided.

In order to regulate the heat provided by the gases of combustion from the ports 12, 12, the roof 31 made up of refractory blocks, as shown in Fig. 2, is adjustable vertically by means of the hangers 32 carried by the beam 33. This beam is in turn carried by the hangers 34 supported on the transverse beam 35 and adjustable up and down by means of the nuts 36 provided with suitable handles. It will be understood that there are a series of beams 33 arranged longitudinally of the furnace in order to provide for the adjustment of a section of the top corresponding in length to the length of the regenerator chambers. The top 37 of each of the ports 12 is also made in sections and adjustable vertically by hangers 40 in the same manner as the roof of the furnace and this adjustable top in connection with the adjustable gates 38 provide a means for regulating the amount of flow through the ports. As the area is cut down, the velocity of flow increases so that this tends to cause the flame from the ports to extend further across the width of the furnace. Adjustment may, therefore, be made to suit varying operation conditions and to give the desired velocity of flow. The inlet ends of the ports 12, 12 are also provided with adjustable gates 39 supported from the beam 35 by the hangers 40. As indicated in Fig. 3, these gates extend in series along the length of the regenerator chambers so that the width of the inlet space 41 to the ports may be adjusted to meet requirements. Normally, the gates at the right hand end of the chamber will be adjusted lower than those at the left hand end (Fig. 3) in order to produce a more even distribution of the flow from the regenerator chamber as otherwise the flow into the chamber at the right hand end would be much greater than at the left hand end and this would result in an uneven heating of the glass along the length of the melting end. By the use of these gates, therefore, the heating effect along the length of the melting end may be regulated to secure uniformity, or if desired, may be so regulated as to give greater heating effect at the end of the furnace at which the batch is supplied, the adjustment depending upon the heat conditions desired in the furnace. The construction as heretofore described lends itself to advantage to a construction employing the horizontal checker work, as shown in Figs. 1 and 2, as opposed to the vertical system of checker work ordinarily employed. The compartment 4 above the wall 5 acts as a dust collector and a great part of the dust carried by the gases of combustion is deposited on this wall instead of being deposited in the checker work. As a result, the checker work requires cleaning only at very long intervals so that shut-downs for this purpose are reduced to a minimum.

Figs. 7 and 8 illustrate a modified form of burner block. Instead of the continuous burner block of Figs. 4 and 5, individual burner blocks 42 may be employed supplied from pipes 43 and these burner blocks may be made of mullite, sillimanite, or other very refractory material, which will resist the action of the heat for a longer period than the ordinary clay block.

Figs. 9 and 10 illustrate the application of the invention in a somewhat different way in a furnace using vertical checker work 44. In this case, the combustible gas for the air ports 45 is supplied from a gas pipe 46 extending longitudinally of the furnace and connected to the ports by means of the inclined passages 47. This is a less desirable construction because of the vertical checker work and because the passages 47 are inclined to the line of flow through the ports 45, instead of being in parallel therewith, as is the case with the passages 18 of the Figs. 1 to 6 construction. However, this construction does involve an advantage over supplying the combustible gas at right angles to the line of flow of the air and gives a satisfactory construction for use with producer gas. The furnace is provided with the adjustable roof sections similar to those of the Figs. 1 to 6 construction, and, therefore, requires no further explanation.

What we claim is:

1. In combination in a glass melting furnace having regenerator chambers provided with checker work arranged along the sides at the melting end, with air admission ports leading from the chambers into the furnace and means for reversing the flow of air between the two chambers, gas admission boxes beneath the air admission ports having openings leading from the boxes into the ports back of the outlet ends of said ports and directed toward the outlet end of the ports, means for supplying combustible gas under pressure to the boxes during the period of furnace operation in which the air flows toward the furnace, and means for supplying a non-combustible gas under pressure to the boxes during the period of furnace operation in which the gases flow away from the furnace.

2. In combination in a glass melting furnace having regenerator chambers provided with checker work arranged along the sides at the melting end with a single elongated air admission port on each side of the furnace leading from the chamber to the furnace and means for reversing the flow of air between the two chambers, gas admission boxes beneath the air admission port having openings leading into the ports, and a series of vertically adjustable flow regulating blocks at the inlet end of each of said ports whereby the flow of air from the chamber to each part of the ports along the length thereof may be adjusted.

3. In combination in a glass melting furnace having regenerator chambers provided with checker work arranged along the sides at the melting end, with air admission passages leading from the chambers into the furnace having roof members thereabove and means for reversing the flow of air between the two chambers, gas admission boxes beneath the air admission passages having openings leading from the boxes into the passages, and an independent vertically adjustable roof for each regenerator chamber which may be moved up and down independently of said roof members.

4. In combination in a glass melting furnace having regenerator chambers provided with checker work arranged along the sides at the melting end, with a single elongated air admission port on each side of the furnace leading from the chamber to the furnace and means for reversing the flow of air between the two chambers, gas admission boxes beneath the air admission port having openings leading into the ports, a vertically adjustable roof or cover for each regenerator chamber, and a series of vertically adjustable flow regulating blocks at the inlet end of each of said ports whereby the flow of air from the chamber to each part of the ports along the length thereof may be adjusted.

5. In combination in a glass melting furnace having regenerator chambers arranged along its melting end, a horizontal division wall which separates each chamber into an upper and a lower compartment, said walls terminating short of one end of the chambers, checker work in the compartments below the division walls, a single elongated air admission port leading from the upper compartment of each chamber into the furnace, means for supplying a combustible gas to each of said ports, and a series of vertically adjustable flow regulating blocks at the inlet end of each of said ports whereby the flow of air from the chamber to each part of the ports along the length thereof may be adjusted.

6. In combination in a glass melting furnace having regenerator chambers provided with checker work arranged along the sides at the melting end, with air admission ports leading from the chambers into the furnace and means for reversing the flow of air between the two chambers, gas admission boxes having ports adjacent the ends of the air admission ports, means for supplying combustible gas to the boxes during the period of furnace operation in which the air flows toward the furnace, and means for supplying a non-combustible gas under pressure to the boxes during the period of furnace operation in which the gases flow away from the furnace.

7. In combination in a glass melting tank having regenerator chambers provided with checker work arranged along the melting end of the tank, a plurality of independent roof sections arranged end to end and covering the melting end of the tank, means supporting each roof section entirely from above so that each section may be raised and lowered bodily at will independent of the other roof sections, refractory closure plates at the sides of the sections supported from above having a vertical dimension which is a multiple of the thickness of the sections so as to maintain a closure when the sections are adjusted up and down, air admission ports leading from the chambers into the furnace beneath the roof sections, and gas admission means for supplying a combustible gas to the ports.

LEE SHOWERS.
K. G. KUTCHKA.